(12) United States Patent
Gurumurthi et al.

(10) Patent No.: US 12,181,959 B2
(45) Date of Patent: Dec. 31, 2024

(54) METHOD AND APPARATUS FOR FAULT PREDICTION AND MANAGEMENT

(71) Applicant: Advanced Micro Devices, Inc., Santa Clara, CA (US)

(72) Inventors: Sudhanva Gurumurthi, Austin, TX (US); Vilas K. Sridharan, Boxborough, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/718,168

(22) Filed: Dec. 17, 2019

(65) Prior Publication Data

US 2021/0182135 A1 Jun. 17, 2021

(51) Int. Cl.
*G06F 11/00* (2006.01)
*G06F 11/07* (2006.01)
*G06F 11/10* (2006.01)

(52) U.S. Cl.
CPC ........ *G06F 11/079* (2013.01); *G06F 11/0727* (2013.01); *G06F 11/0751* (2013.01); *G06F 11/1068* (2013.01)

(58) Field of Classification Search
None
See application file for complete search history.

(56) References Cited

U.S. PATENT DOCUMENTS

| | | | | |
|---|---|---|---|---|
| 5,263,032 A * | 11/1993 | Porter | .................... | G06F 11/106 714/764 |
| 10,733,049 B2 * | 8/2020 | Kim | ........................ | G11C 29/76 |
| 2006/0026385 A1 * | 2/2006 | Dinechin | ............ | G06F 12/1036 711/206 |
| 2009/0164872 A1 * | 6/2009 | Chessin | ................ | G06F 11/008 714/765 |
| 2013/0110794 A1 * | 5/2013 | Lee | ........................ | G06F 16/215 707/E17.002 |
| 2015/0199234 A1 * | 7/2015 | Choi | ................... | G11C 29/4401 714/764 |
| 2016/0203044 A1 * | 7/2016 | Kwon | .................... | G11C 29/76 714/763 |
| 2016/0357628 A1 * | 12/2016 | Chinnakkonda Vidyapoornachary | ...................... | G06F 3/0619 |
| 2016/0371014 A1 * | 12/2016 | Roberts | ................. | G06F 3/0688 |
| 2017/0091023 A1 * | 3/2017 | Gilda | .................. | G06F 11/1068 |
| 2017/0147416 A1 * | 5/2017 | Ranjan | .................. | G06F 11/079 |
| 2017/0344483 A1 * | 11/2017 | Shwartsman | ....... | G06F 12/0862 |
| 2018/0129557 A1 * | 5/2018 | Franca-Neto | ....... | G06F 11/1048 |
| 2018/0150345 A1 * | 5/2018 | Porwal | ................ | G06F 11/0787 |
| 2020/0089559 A1 * | 3/2020 | Ainsworth | .......... | G06F 11/1629 |
| 2021/0182135 A1 * | 6/2021 | Gurumurthi | ........ | G06F 11/1064 |

OTHER PUBLICATIONS

Google Scholar/Patents—text refined (Year: 2021).*
Google Scholar/Patents search—text refined (Year: 2022).*
Google Scholar/Patents search—text refined (Year: 2023).*

(Continued)

*Primary Examiner* — Christopher S McCarthy

(74) *Attorney, Agent, or Firm* — Volpe Koenig

(57) ABSTRACT

A method and apparatus for predicting and managing a fault in memory includes detecting an error in data. The error is compared to one or more stored errors in a filter, and based upon the comparison, the error is predicted as a transient error or a permanent error for further action.

21 Claims, 3 Drawing Sheets

(56) References Cited

OTHER PUBLICATIONS

Google Scholar/Patents search—text refined (Year: 2024).*
Sridharan, V. and Liberty, D., "A Study of DRAM Failures in the Field," SC '12: Proceedings of the International Conference on High Performance Computing, Networking, Storage and Analysis, Article No. 76, 11 pages, Nov. 2012.
Sridharan, V., et. al., "Feng Shui of Supercomputer Memory," SC '13: Proceedings of the International Conference on High Performance Computing, Networking, Storage and Analysis, Article No. 22, 11 pages, Nov. 2013.
Sridharan, V., et. al., "Memory Errors in Modern Systems," ASPLOS '15: Proceedings of the Twentieth International Conference on Architectural Support for Programming Languages and Operating Systems, 14 pgs., Mar. 2015.
Lyons, M. J., and Brooks, D., "The Design of a Bloom Filter Hardware Accelerator for Ultra Low Power Systems," SLPED '09: Proceedings of the 2009 ACM/IEEE International Symposium on Low Power Electronics and Design, 6 pgs., Aug. 2009.
Sethumadhavan, S., et.al., "Scalable Hardware Memory Disambiguation for High ILP Processors," MICRO 36: Proceedings of the 36th Annual IEEE/ACM International Symposium on Microarchitecture, IEEE, 12 pgs., Dec. 2003.

* cited by examiner

METHOD AND APPARATUS FOR FAULT PREDICTION AND MANAGEMENT

BACKGROUND

Current and future memories (e.g., dynamic random access memory (DRAM)) are susceptible to a variety of permanent faults. This permanent fault problem is already well-known for non-volatile (NV) RAM. It is challenging to ascertain or predict while a system is running whether errors from memory are transient or permanent and implementing fault prediction without tracking the history of errors in the system and running analytics in hardware. Such knowledge can be useful in determining when and which reliability/availability/serviceability (RAS) techniques to apply to cope with such faults to leverage many self-healing features supported in current devices and platforms.

BRIEF DESCRIPTION OF THE DRAWINGS

A more detailed understanding can be had from the following description, given by way of example in conjunction with the accompanying drawings wherein.

DETAILED DESCRIPTION

Although the method and apparatus will be expanded upon in further detail below, briefly a method for predicting fault permanency and handling the fault is described herein.

A Bloom filter is added to a memory controller that is hashed based on the physical address of data (e.g., cacheline) fetched from memory where an error correcting code (ECC) logic detects and corrects an error and a workflow that leverages a redirect scrubber to predict if an error is permanent or transient.

For example, if a Bloom filter membership test based on that address does not match, the underlying fault is predicted as transient and the address is added (via hashing) to that filter and a redirect scrub is performed. If the membership test results in a match, a redirect scrub is not done and the fault is predicted to be permanent.

The specific bits in error can be pinpointed using the ECC process. This prediction is communicated to higher layers of the system (e.g., operating system (OS)) by having a "predicted permanent" bit in the machine check architecture (MCA) bank for memory. This prediction can be leveraged by the OS for page retirement, post-package repair (PPR), or prioritization of dual in-line memory module (DIMM) replacement. However, these actions are example actions and other actions can also be taken.

A method for predicting and managing a fault in memory includes detecting an error in data. The error is compared to one or more stored errors in a filter, and based upon the comparison, the error is predicted as a transient or permanent error for further action.

An apparatus for predicting and managing a fault in memory includes a memory and a memory controller including a filter, the memory controller communicatively coupled with the memory. The memory controller detects an error in data, compares the error to one or more stored errors in the filter, and based upon the comparison, predicts the error as a transient or permanent error for further action.

A non-transitory computer-readable medium for predicting and managing a fault in memory has instructions recorded thereon, that when executed by the processor, cause the processor to perform operations. The operations include detecting an error in data, comparing the error to one or more stored errors in a filter, and based upon the comparison, predicting the error as a transient or permanent error for further action.

Figure 1:
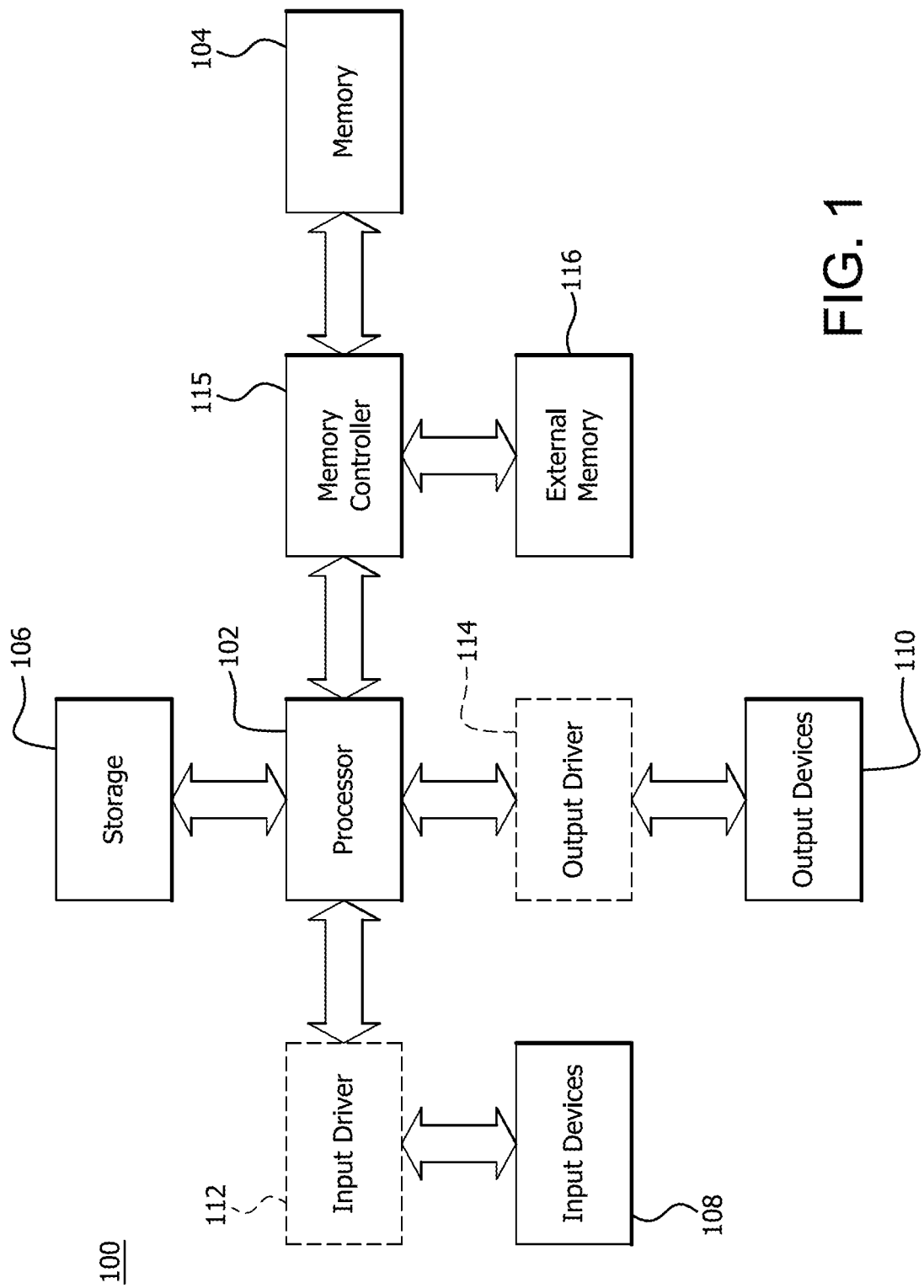
FIG. 1 is a block diagram of an example device in which one or more features of the disclosure can be implemented.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. Additionally, the device 100 includes a memory controller 115 that communicates with the processor 102 and the memory 104, and also can communicate with an external memory 116. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

The external memory 116 may be similar to the memory 104, and may reside in the form of off-chip memory. Additionally, the external memory may be memory resident in a server where the memory controller 115 communicates over a network interface to access the memory 116.

Figure 2:
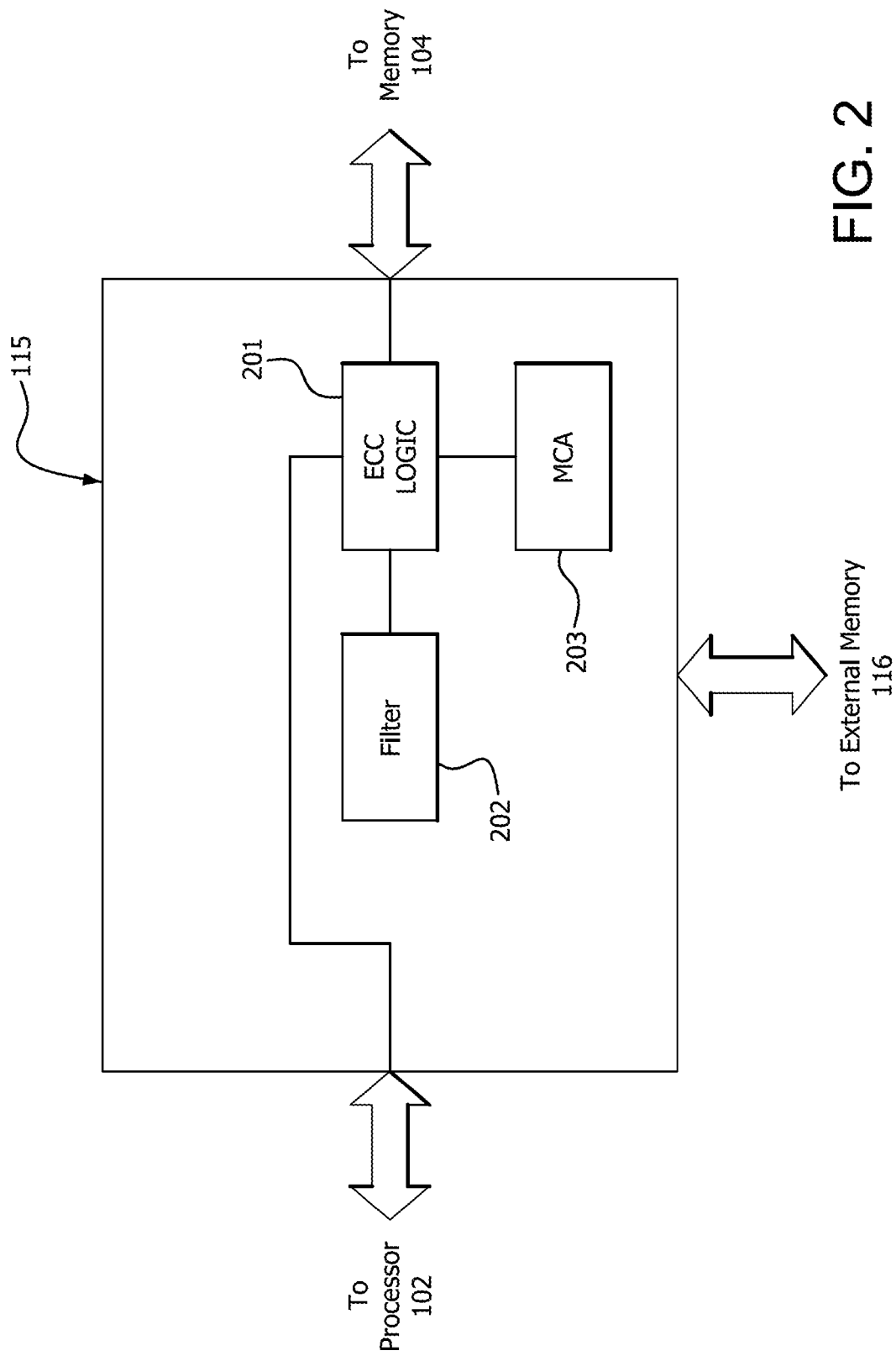
FIG. 2 is a block diagram of an example memory controller in which one or more of the features of the disclosure can be implemented.

FIG. 2 is a block diagram of an example memory controller 115 in which one or more of the features of the disclosure can be implemented. The memory controller 115 includes ECC logic 201, a filter 202 and an MCA 203. The filter 202 may be in the form of a Bloom filter, which is a data structure that is designed to quickly, and with a bounded storage requirement, tell whether an element is present in a set. A Bloom filter is a bit-vector of a specific length that has properties that include providing no false negatives. That is, if an element is in the set, a membership test on the Bloom filter will not return a false. However, false positives are possible. That is, if an element is not in the set, a membership test may return true.

One or more hash functions may be used to access the filter. When an element is tested for membership, the hash functions are used to determine if the bit-positions that each function hashes to is a 1. If every such bit-position is equal to 1, the element is considered (i.e., predicted) to belong to the set. If not, the element does not exist in the set. To add an element to the set, the same hash functions are used to determine the bit-positions the element hashes to in the filter. These bit-positions are then set to 1. If a particular bit-position is already a 1, then it remains set to that value.

If a Bloom filter uses k hash functions, m bits for the filter, and there are n elements in the set, the false positive rate will be approximately in accordance with the following equation:

$$\left(1 - e^{-\frac{kn}{m}}\right)^k. \quad \text{(Equation 1)}$$

The ECC logic 201 reads cacheline data received to and from the processor 102 and memory, such as memory 104 or external memory 116. The ECC logic 201 is in communication with both the filter 202 and the MCA 203. Although for purposes of example, the ECC logic 201 is depicted as residing in the memory controller 115, the ECC logic 201, as well as the filter 202 and MCA 203 may reside elsewhere.

Figure 3:
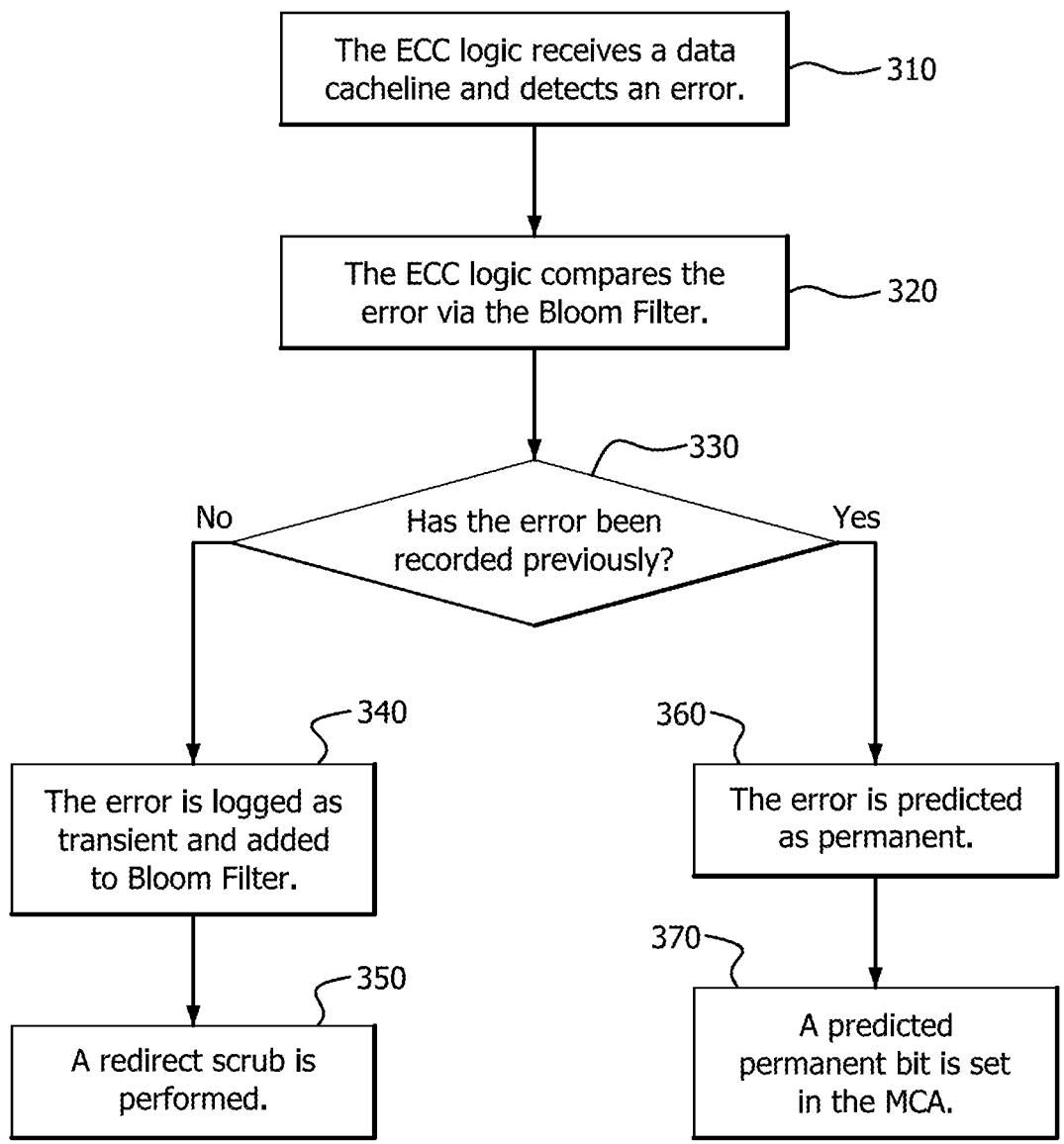
FIG. 3 is a flow diagram of an example method of fault prediction and management.

In accordance with the device 100 and memory controller 115 depicted in FIGS. 1 and 2, FIG. 3 is a flow diagram of an example method 300 of fault prediction and management.

In step 310, the ECC logic 201 receives a data cacheline (e.g., from memory 104 or external memory 116) and detects an error. As described above, the ECC logic 201 compares the error via the Bloom filter (step 320). That is, the error element is tested for membership in the Bloom filter utilizing the hash function to determine if the bit-positions that each function hashes to is a one (1) or a zero (0).

In step 330, it is determined whether or not the error has been previously recorded. That is, if every such bit position is equal to 1, the element is considered (i.e., predicted) to belong to the set. If not, the element does not exist in the set.

If it is determined in step 330 that the error has not been recorded previously, then the error is logged as transient and added to the filter 202 (step 340). In addition, a redirect scrub is performed (step 350). That is, the address is added via hashing to the filter 202 by the ECC logic 201 and error correction is performed via the redirect scrub, which writes back the corrected data. The same hash functions are used to determine the bit-positions the element hashes to in the filter 202, and these bit positions are then set to 1.

If it is determined in step 330 that the error has been recorded previously, then the error is predicted to be permanent and not transient (step 360) and a predicted permanent bit is set in the MCA 203 (step 370). That is, if every bit position in the error element is equal to 1, the element is predicted to belong to the set and therefore predicted to be a permanent error.

The predicted permanent bit, and address of the error, for example, stored in the MCA 203 may then be utilized to inform higher layers such that action can be taken with respect to the permanent error. Additionally, the syndrome, which is a vector used to determine whether the bits protected by the ECC logic 201 have an error or not, and are stored in the MCA 203 and may be utilized to inform higher layers such that action can be taken with respect to the permanent error. For example, if 'k' bits are to be protected by ECC logic 201, which are the bits in the cache line. Then, 'c' extra bits ('c' for 'check bits') are appended to those k bits and a mathematical function (i.e., the ECC code) is used to generate the values of those c bits based on the value of the k-bit vector. The (k+c) bits are stored in memory. When reading back those (k+c) bits, the same ECC mathematical function is computed over those (k+c) bits. The output of that function is the syndrome. If the syndrome vector is all zeros, then the ECC logic 201 determines that the data is error-free. If the syndrome is not all zeros, then there is an error detected and based on the ECC code and how its implemented, it may be possible to figure out which bit(s) are actually in error and correct them, or just know that there is an error but it cannot be corrected.

For example, the OS may determine to retire the page or perform PPR. Data may be unmapped to the problem area as well. Additionally, the DIMM where the address resides may be targeted for replacement. These actions are several example actions that may be undertaken, but other actions could also be utilized by the OS.

The size of the filter 202 depends on the number of errors hashed into the filter 202. The method described above reduces the number of possible permanent faults that get added to the filter as only predicted transient faults get added and scrubbed. Therefore, this minimizes the storage requirements for the filter. The filter size can then be set based on the rate of transient faults expected for the system. This number depends on the total memory capacity in a socket and the characteristics of the memory technology.

The methods provided can be implemented in a general purpose computer, a processor, or a processor core. Suitable processors include, by way of example, a general purpose processor, a purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure. Further, although the methods and apparatus described above are described in the context of controlling and configuring PCIe links and ports, the methods and apparatus may be utilized in any interconnect protocol where link width is negotiated.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). For example, the methods described above may be implemented in the processor 102 or on any other processor in the computer system 100.

What is claimed is:

1. A method for predicting and managing a fault in memory, comprising:
    detecting an error in data that is read from the memory, wherein the detecting an error in data includes detecting a physical address for the error in the data;
    comparing the physical address to one or more stored errors using a filter, the comparing comprising applying a plurality of hash functions to the physical address to obtain a set of bit positions;
    classifying the error as a permanent error based on whether a set of bit values at each bit position is equal to 1; and
    updating a machine check architecture (MCA) to indicate that the physical address contains the permanent error in response to the error being classified as the permanent error, wherein the MCA includes a vector identifying a bit error of bits stored at the physical address.

2. The method of claim 1, wherein the error in data is detected by reading an error in a cacheline.

3. The method of claim 1, further comprising correcting the error.

4. The method of claim 3, wherein correcting the error includes writing corrected data to a memory.

5. The method of claim 1, further comprising setting a predicted permanent bit in the MCA to indicate the error is predicted permanent.

6. The method of claim 5, further comprising sending information to an operating system (OS) by the MCA about the permanent error.

7. The method of claim 6, wherein the information includes at least one of the predicted permanent bit, the physical address of the error, and a syndrome.

8. The method of claim 6, further comprising performing, by the OS, a page retirement or a post-package repair (PPR).

9. The method of claim 1, wherein the filter is a Bloom filter.

10. The method of claim 1, wherein the error has not been previously recorded in the filter.

11. An apparatus for predicting and managing a fault in a memory, comprising:
    a filter;
    a machine check architecture (MCA); and
    a memory controller that is communicatively coupled with the memory, the filter and the MCA,
    wherein the memory controller:
    detects an error in data that is read from the memory, wherein the detecting an error in data includes detecting a physical address for the error in the data,
    compares the physical address to one or more stored errors using the filter, the comparing comprising applying a plurality of hash functions to the physical address to obtain a set of bit positions,
    classifies the error as a permanent error based on whether a set of bit values at each bit position is equal to 1, and
    update the MCA to indicate that the physical address contains the permanent error in response to the error being classified as the permanent error, wherein the MCA includes a vector identifying a bit error of bits stored at the physical address.

12. The apparatus of claim 11, wherein the error in the data is detected by reading an error in a cacheline.

13. The apparatus of claim 11, further comprising the memory controller correcting the error.

14. The apparatus of claim 13, wherein correcting the error includes the memory controller writing corrected data to the memory.

15. The apparatus of claim 11, further comprising the memory controller setting a predicted permanent bit in the MCA to indicate the error is predicted permanent.

16. The apparatus of claim 15, wherein the the memory controller further:
    sends information to an operating system (OS) about the permanent error.

17. The apparatus of claim 16, wherein the information includes at least one of the predicted permanent bit, the physical address of the error, and a syndrome.

18. The apparatus of claim 16, further comprising performing, by the OS, a page retirement or a post-package repair (PPR).

19. The apparatus of claim 11, wherein the error has not been previously recorded in the filter.

20. A non-transitory computer-readable medium for predicting and managing a fault in memory, the non-transitory computer-readable medium having instructions recorded thereon, that when executed by a processor, cause the processor to perform operations including:
    detecting an error in data that is read from the memory, wherein the detecting an error in data includes detecting a physical address for the error in the data;
    comparing the physical address to one or more stored errors using a filter, the comparing comprising applying a plurality of hash functions to the physical address to obtain a set of bit positions;
    classifying the error as a permanent error based on whether a set of bit values at each bit position is equal to 1; and
    updating a machine check architecture (MCA) to indicate that the physical address contains the permanent error in response to the error being classified as the permanent error, wherein the MCA includes a vector identifying a bit error of bits stored at the physical address.

21. The non-transitory computer-readable medium of claim 20, wherein the error has not been previously recorded in the filter.

* * * * *